US007613906B2

(12) United States Patent
Rychlik (10) Patent No.: US 7,613,906 B2
(45) Date of Patent: Nov. 3, 2009

(54) ADVANCED LOAD VALUE CHECK ENHANCEMENT

(75) Inventor: Bohuslav Rychlik, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 11/202,770

(22) Filed: Aug. 12, 2005

(65) Prior Publication Data

US 2007/0035550 A1    Feb. 15, 2007

(51) Int. Cl.
*G06F 9/30*    (2006.01)
*G06F 9/40*    (2006.01)
*G06F 15/00*    (2006.01)

(52) U.S. Cl. ...................................... 712/218
(58) Field of Classification Search .................. 712/218
See application file for complete search history.

(56) References Cited

U.S. PATENT DOCUMENTS

| | | | | |
|---|---|---|---|---|
| 5,467,473 | A * | 11/1995 | Kahle et al. ..................... | 712/23 |
| 5,542,075 | A * | 7/1996 | Ebcioglu et al. ............ | 717/151 |
| 5,682,493 | A * | 10/1997 | Yung et al. ................... | 712/217 |
| 6,408,379 | B1 * | 6/2002 | Juffa et al. .................. | 712/222 |
| 6,463,579 | B1 * | 10/2002 | McKinsey ................... | 717/146 |
| 6,658,559 | B1 * | 12/2003 | Arora et al. ................. | 712/245 |
| 6,681,317 | B1 * | 1/2004 | Mathews .................... | 712/203 |
| 6,728,867 | B1 | 4/2004 | Kling | |
| 2002/0124156 | A1 * | 9/2002 | Yoaz et al. .................. | 712/225 |
| 2005/0055516 | A1 | 3/2005 | Menon et al. | |

FOREIGN PATENT DOCUMENTS

WO    0026771    5/2000

OTHER PUBLICATIONS

Kim et al.; Implementing Optimizations at Decode Time; 2002; IEEE Computer Society; ACM SIGARCH Computer Architecture News, vol. 30, Issue 3; pp. 221-232.*
Yoaz et al.; Silence is Golden?; 2001; IEEE Computer Society.*
International Search Report-PCT/US06/031297, International Search Authority-European Patent Office-Mar. 16, 2007.
International Preliminary Report on Patentability-PCT/US06/031297, The International Bureau of WIPO, Geneva Switzerland-Feb. 12, 2008.
Written Opinion-PCT/US06/031297-International Search Authority-European Patent Office-Mar. 16, 2007.

* cited by examiner

*Primary Examiner*—Eddie P Chan
*Assistant Examiner*—Corey S Faherty
(74) *Attorney, Agent, or Firm*—Nicholas J. Pauley; Peter Kamarchik; Sam Talpalatsky (57) ABSTRACT

Systems and methods for performing re-ordered computer instructions are disclosed. A computer processor loads a first value from a first memory address, and records both the first value and the second value in a table or queue. The processor stores a second value to the same memory address, and either evicts the previous table entry, or adds the second value to the previous table entry. Upon subsequently detecting the evicted table entry or inconsistent second value, the processor generates an exception that triggers recovery of speculative use of the first value.

25 Claims, 7 Drawing Sheets

ADVANCED LOAD VALUE CHECK ENHANCEMENT

BACKGROUND

1. Field

The present disclosed embodiments relate generally to computing, and more specifically to performing advanced prefetch operations in processors.

2. Background

Computer programs are lists of instructions that, when executed, cause a computer to behave in a predetermined manner. In general, a program may contain a list of variables and a list of statements that tell the computer what to do with the variables. A programmer may write a computer program in a "high-level" programming language, which is easily understood by humans. This form of the program is called the "source code. To execute the program on a computer, however, the source code must be converted into machine language, which is the "low level" language that is usable by the computer.

The first step of this translation process is usually performed by a utility called a compiler, which interprets the source code into a form closer to machine language. A compiler can have additional functions besides this interpretation function. For example a compiler can look at the source code and re-order some of the instructions in it as well as performing other optimizations. The compiler converts the source code into a form called "objects code." Sometimes the object code is the same as machine language; sometimes it needs to be further processed before it is ready to be executed by the computer.

One optimization compilers may perform is in re-ordering instructions within a computer program to operate more efficiently than a simple conversion of the programmer's version of the source code would have yielded.

For example, a program may operate on a variable. Commonly variables are located in memory and must be accessed before they are available for use. In a processor such an access of memory takes a finite amount of time. If the variable has not been obtained from memory when the program is ready to use it a delay may be encountered while the variable is transferred into memory.

Two common types of computer instructions are load instructions ("Loads") and store instructions ("Stores"). Loads may access memory to fetch data that is needed by the program. Stores are often considered secondary because they merely store final data to memory, such as a final computation result that is not subsequently needed by the program. Therefore, program efficiency may be improved by advancing Loads ahead of Stores.

Figure 1:
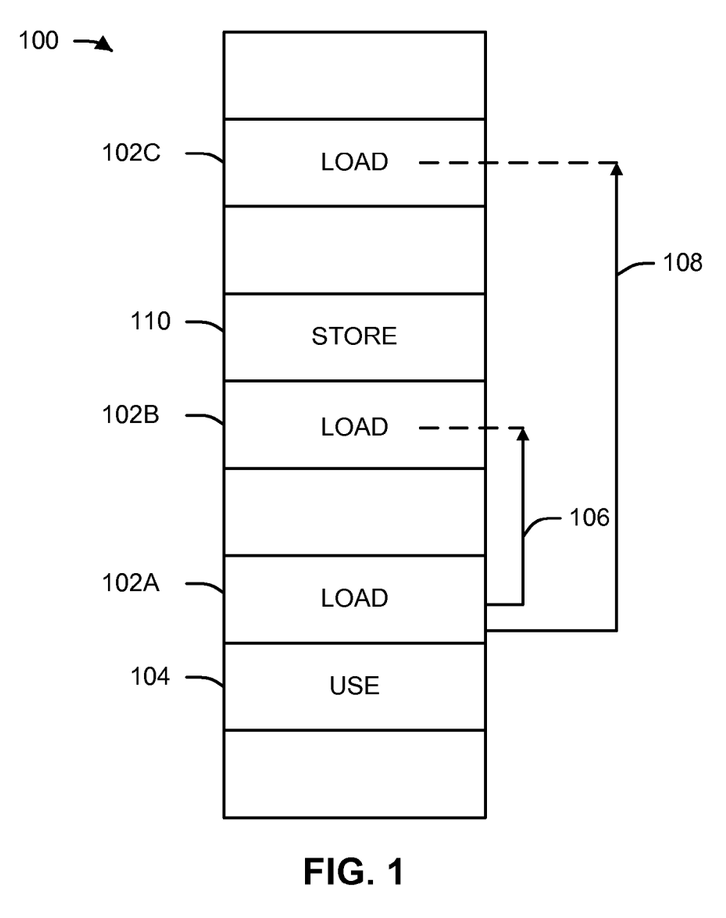
FIG. 1 illustrates an example of Load/Store aliasing.

Unfortunately, this technique causes a significant problem called "Load/Store aliasing." A Load/Store alias occurs when a Store writes data to the same memory address that a Load reads from. FIG. 1. illustrates an example of this situation. A processor register 100 may contain a series of instructions from a computer program being executed. The programmer may have included a Load 102A just before a "Use" instruction ("Use") 104 in the source code. The Use 104 may be a calculation utilizing data that was retrieved by the Load 102A. As explained above, a compiler may improve overall program efficiency at run time by hoisting the Load 102A higher above the Use 104 than the programmer had originally placed it in the source code, indicated by arrow 106. One reason is that the process of accessing a computer's memory is sometimes slow, and if the Load 102A and the Use 104 are too close together, then when the computer encounters the Use 104 it may have to wait for the Load 102A to retrieve data needed to perform the Use 104. If a compiler can put the Load 102A earlier, such as at position 102B, then the computer will be more likely to already have the retrieved data by the time it encounters the Use 104. Thus, by hoisting Loads above Use instructions, a compiler can reduce waiting time and increase program efficiency.

However, if a the Load 102 is hoisted too far above the Use 104, it may be hoisted above an intervening Store 110 as indicated by arrow 108. If the intervening store 110 happens to write new data to the same memory address accessed by the Load 102, Load/Store aliasing occurs. In operation, the Load 102C will read data (such as the value "0") from a specified memory address, then the intervening Store 110 will save new data (such as the value "1") to that same memory address. When the Use 104 is encountered, it will receive the "0" instead of the "1," because "0" was the value read by the Load 102C. However, the programmer may have intended the Use 104 to receive the value "1," which is why he would have placed the intervening Store 110 (which stores the value "1") before the Load 102A and the Use 104 when writing the source code. By moving the Load 102A any higher than the intervening Store 110, then, the compiler can cause the Use 104 to receive incorrect data. Therefore, although it may generally be beneficial to hoist Loads above Stores, most compilers are limited by intervening Stores. This presents significant performance problems in high-performance microprocessors and parallelizing compilers.

One method for dealing with this issue is called "data speculation." Specialized instructions called "Advanced Load" ("LD.A") and "Check Advanced Load" ("CHK.A") are employed by data speculation. LD.A is a Load that, when retrieving data from a memory address, inserts that memory address into a table called the "Advanced Load Address Table" ("ALAT"). The loaded data is then used speculatively by other program instructions. Meanwhile, all Stores, when storing data to a memory address, compare that address against the addresses registered in the ALAT. Any matching entries (aliases) are evicted from the ALAT. When a subsequent CHK.A detects that a value has been evicted from the ALAT, it may generate an exception.

An exception is a condition that causes a program or microprocessor to branch to a different routine, and usually indicates an error condition. In this case, the exception generated when an ALAT eviction is detected triggers recovery of the speculative use of the data previously retrieved by the LD.A. That data turned out to be incorrect data (caused by the aliasing), so its use must be rectified in the exception-triggered recovery process. Such recovery requires a significant amount of work and processing time, and considerably hampers performance. Thus, generation of exceptions is not desired, and excessive numbers of exceptions may significantly counteract any gains that were achieved when the compiler reordered the instructions in the first place.

SUMMARY

In one aspect of the present invention, a method of executing re-ordered program instructions includes loading a first value from a first memory address, recording the first memory address in a table configured to record associations between memory addresses and values, recording the first value in the table such that the first value is associated with the first memory address, storing a second value to a second memory address, and determining that the first and second memory addresses are the same.

In another aspect of the present invention, a computer readable media embodies a program of instructions executable by a computer to perform a method of executing re-ordered program instructions, the method including loading a first value from a first memory address, recording the first memory address in a table configured to record associations between memory addresses and values, recording the first value in the table, such that the first value is associated with the first memory address, storing a second value to a second memory address, and determining that the first and second memory addresses are the same.

In another aspect of the present invention, a computer system includes memory configured to store data in a plurality of locations denoted by different addresses, and a processor coupled to the memory and configured to load a first value from a first one of the memory addresses, record the first memory address in a table configured to record associations between memory addresses and values, record the first value in the table such that the first value is associated with the first memory address, store a second value to a second one of the memory addresses, and determine that the first and second memory addresses are the same.

In yet another aspect of the present invention, a computer system includes means for storing data, and means for loading a first value from a first memory address, recording the first memory address in a table configured to record associations between memory addresses and values, recording the first value in the table such that the first value is associated with the first memory address, storing a second value to a second memory address, and determining that the first and second memory addresses are the same.

DETAILED DESCRIPTION

Figure 2:
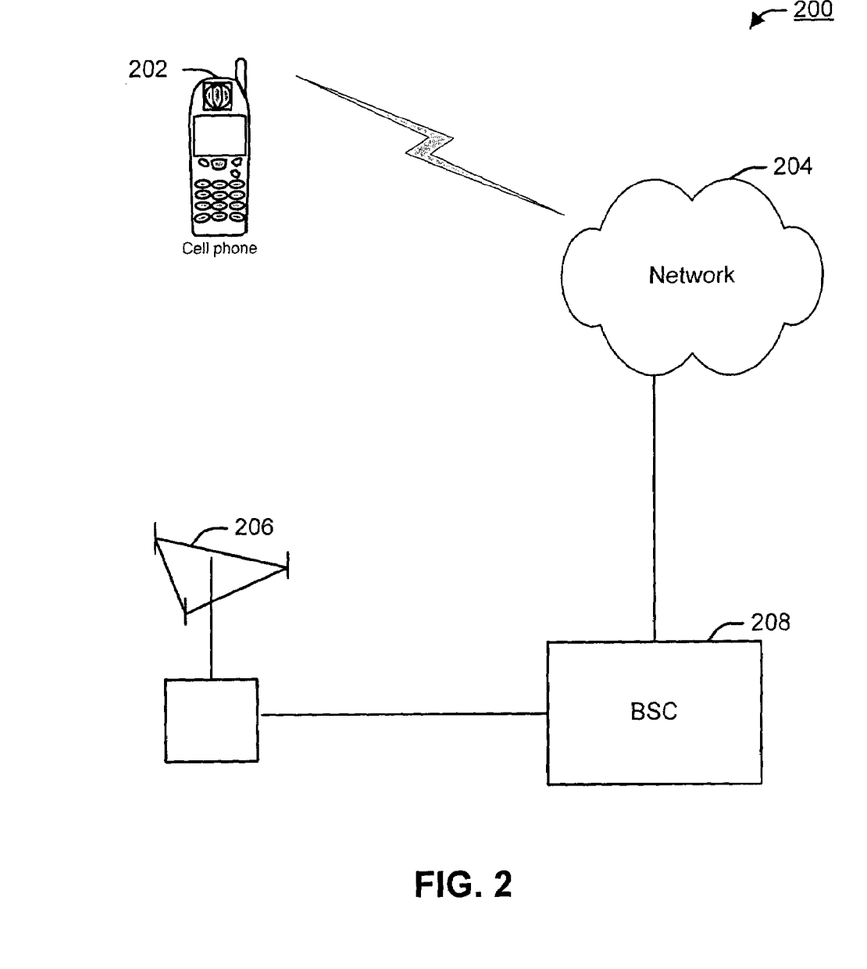
FIG. 2 illustrates a wireless communications system.

FIG. 2 illustrates a wireless communications system in which the various embodiments described herein may be employed. It will be recognized by those skilled in the art that the various embodiments are not limited to use in a communications system, that they may instead have many other practical applications, and that the wireless communications system is used as an illustrative example only. The wireless communications system 200 may include a subscriber station 202 in communication with a land-based data network 204 by transmitting data on a reverse link to a base station 206. The base station 206 may receive the data and route them through a base station controller ("BSC") 208 to the land-based network 204. Conversely, communications to the subscriber station 202 can be routed from the land-based network 204 to the base station 206 via the BSC 208 and transmitted from the base station 206 to the subscriber unit 202 on a forward link.

As those skilled in the art will appreciate, the forward link transmission can occur between the base station 206 and one or more subscriber stations 202 (others not shown). Similarly, the reverse link transmission can occur between one subscriber station 202 and one or more base stations 206 (others not shown).

Figure 3:
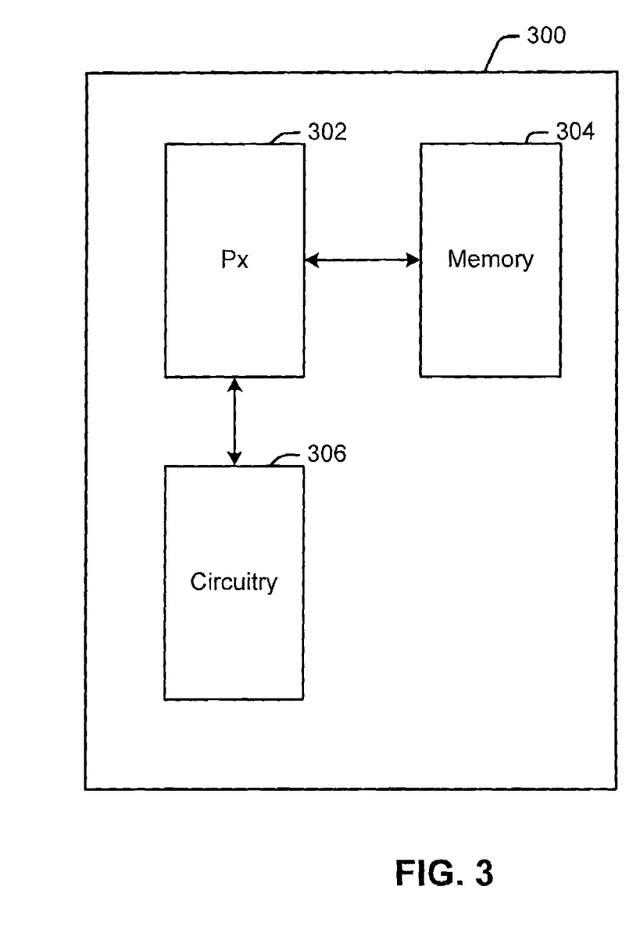
FIG. 3 is a block diagram illustrating components of a telephone system.

FIG. 3 is a block diagram illustrating various components of a portion of a telephone system in which the teachings of the present disclosures may be used. A computer system 300 may comprise a processor 302, memory 304 and other circuitry 306. The computer system 300 may be any type of computer system including, for example, a server, a client, a personal computer, a base station or a subscriber station. Those skilled in the art will appreciate that the teachings herein apply to many other types of computer systems that include a processor coupled to memory. The processor 302 may comprise, for example, an EPIC microprocessor. The microprocessor may be, for example, an INTEL ITANIUM microprocessor. It will be appreciated by those skilled in the art that the teachings herein are equally applicable to other processors that, in conjunction with compilers, are able to re-order instructions and advance Loads beyond intervening Stores. The processor 302 may comprise or communicate with a register for advancing instructions within a computer program. The processor 302 may be in communication with the memory 304 for retrieving and storing data as directed by the computer program instructions. The processor 302 may be configured to allow a compiler to re-order computing instructions within a computer program in accordance with the teachings herein.

As described above, data speculation is a method utilizing the specialized LD.A and CHK.A instructions for mitigating problems associated with Load/Store aliasing. Because data speculation evicts entries in an ALAT every time a Store accesses a memory address already recorded in the ALAT, the CHK.A instruction will result in numerous exceptions. In addition to the efficiency cost of recovering from speculative data use after an exception, this approach is unpredictable because of the branches in routines and subsequent synchronization that are required when an exception is generated. In accordance with the teachings herein, therefore, ALAT entries are not deleted every time a Store accesses a memory address already recorded in the ALAT.

When a computer program is executed, certain values may tend to be consistently, or at least frequently, stored to a particular address. In other words, a certain value may be frequently stored to the same particular address by different instances of a Store, even though the Stores are executed separately and independently. When a first Store writes a first value to a certain address, and then a second store writes a second value to that same address, it is unnecessary to generate an exception to recover from speculative use of the first value if the first and second values are equal. If an intervening Store writes over data with the same data, any instruction that previously used the original data does not need to be corrected because the value of the data was correct even before the intervening Store.

In accordance with these teachings, the ALAT may be configured to store both memory addresses and stored values. Likewise, the CHK.A routine may be modified to compare stored values with values that are recorded in the ALAT, in addition to comparing Store addresses with addresses that are recorded in the ALAT. A processor may be configured to evict an entry in the ALAT only when both of two conditions are met: the Store address matches an address recorded in the ALAT, and the stored value is not equal to the value that is recorded in the ALAT in association with the recorded address. By checking for this case, the processor configuration disclosed herein may eliminate unnecessary exceptions and improve overall program efficiency. If a Store address matches an address recorded in the ALAT, but the stored value is the same as the value that is recorded in the ALAT in association with the recorded address, the ALAT entry may remain in the ALAT, such that an exception will not be later generated by a CHK.A that searches for, and finds, the un-evicted ALAT entry.

Figure 4:
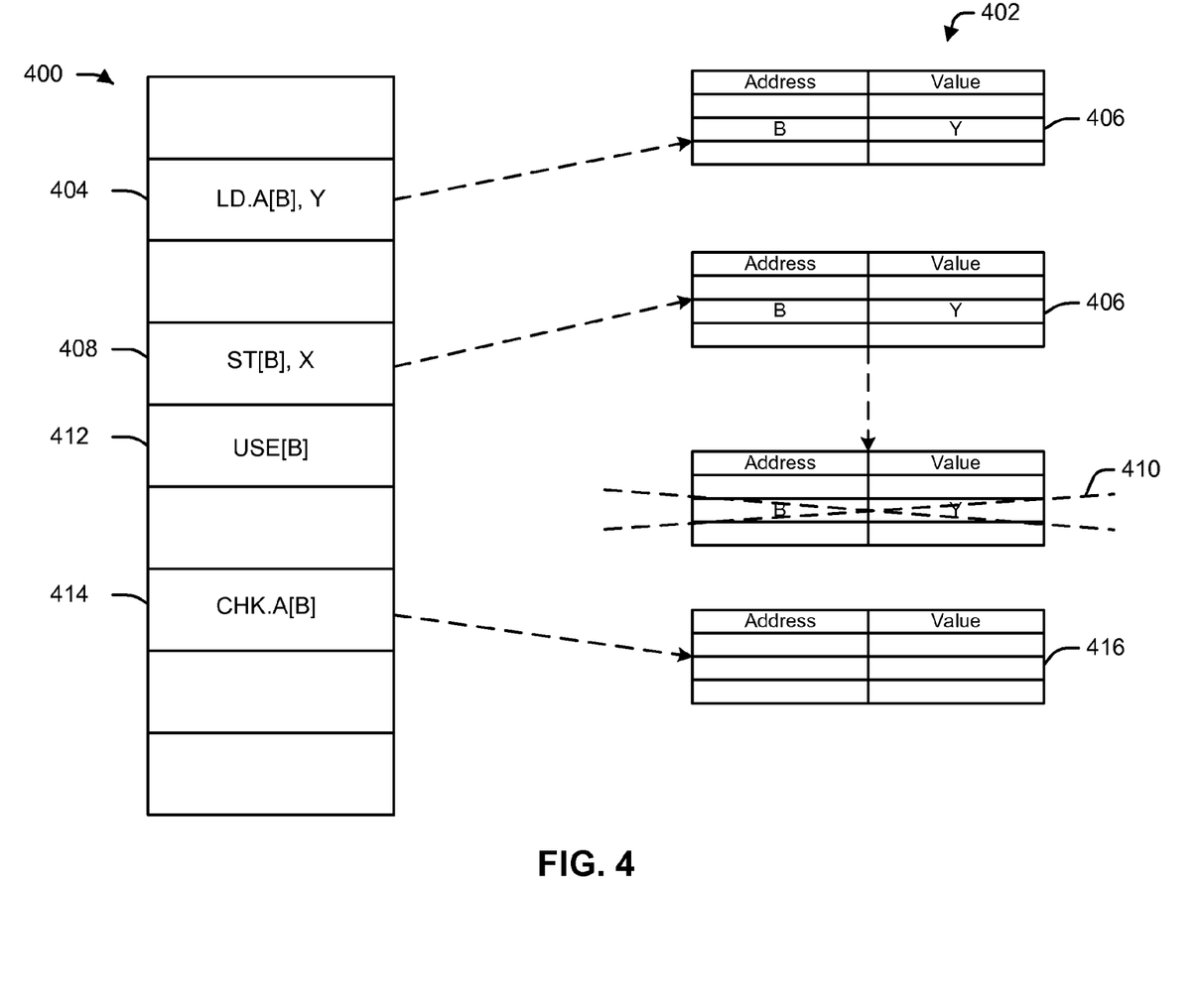
FIG. 4 illustrates an example of a process that includes checking stored values.

FIG. 4 illustrates an example of a process that includes checking stored values. Program instructions in the register 400 of a computer processor are performed in accordance with the process described herein when the program is executed. As certain instructions are performed, an Advanced Load Address and Value Table ("ALAVT") 402 may be accessed. The ALAVT 402 may be stored, for example, in memory that is accessible by the processor, or may be maintained in the processor itself. As program operation proceeds, an LD.A instruction 404 may be encountered. As illustrated in FIG. 4, this may be denoted as LD.A[B], Y, indicating that the processor will perform an instruction to load a value "Y" from a memory address "B". In conjunction with loading this value, or before or after the load occurs, the processor may also access the ALAVT 402 and record the address "B" in association with the value "Y" at entry 406.

Next, the processor may encounter additional instructions, including a ST[B], X instruction 408. In accordance with this instruction, the processor may store a value "X" to the memory address "B." The processor may also access the ALAVT 402 to ascertain whether the address "B" that was just written to was previously loaded from. In checking the ALAVT 402, the processor will encounter entry 406 in which the address "B" was previously recorded. The processor may then query whether the newly stored value "X" is equal to the previously loaded value "Y." If so, the processor may continue with normal program execution. However, if it is determined that "X" is not equal to "Y," then the processor may evict the entry 406 as indicated by the eviction 410. By evicting this entry from the ALAVT 402, the processor is providing an indication that the previously loaded value "Y" from the address "B" may have been improperly used, due to the intervening Store 408. Accordingly, when the processor encounters the CHK.A[B] instruction 414, it will check the ALAVT 402 for an entry with the address "B." However, since that entry was evicted, it will encounter no such entry, as indicated at 416. The detection of no address "B" may cause the processor to generate an exception, triggering recovery of previous use of the value "Y" that was loaded by the Load 404 that may have been incorrect due to the intervening Store 408.

Figure 5:
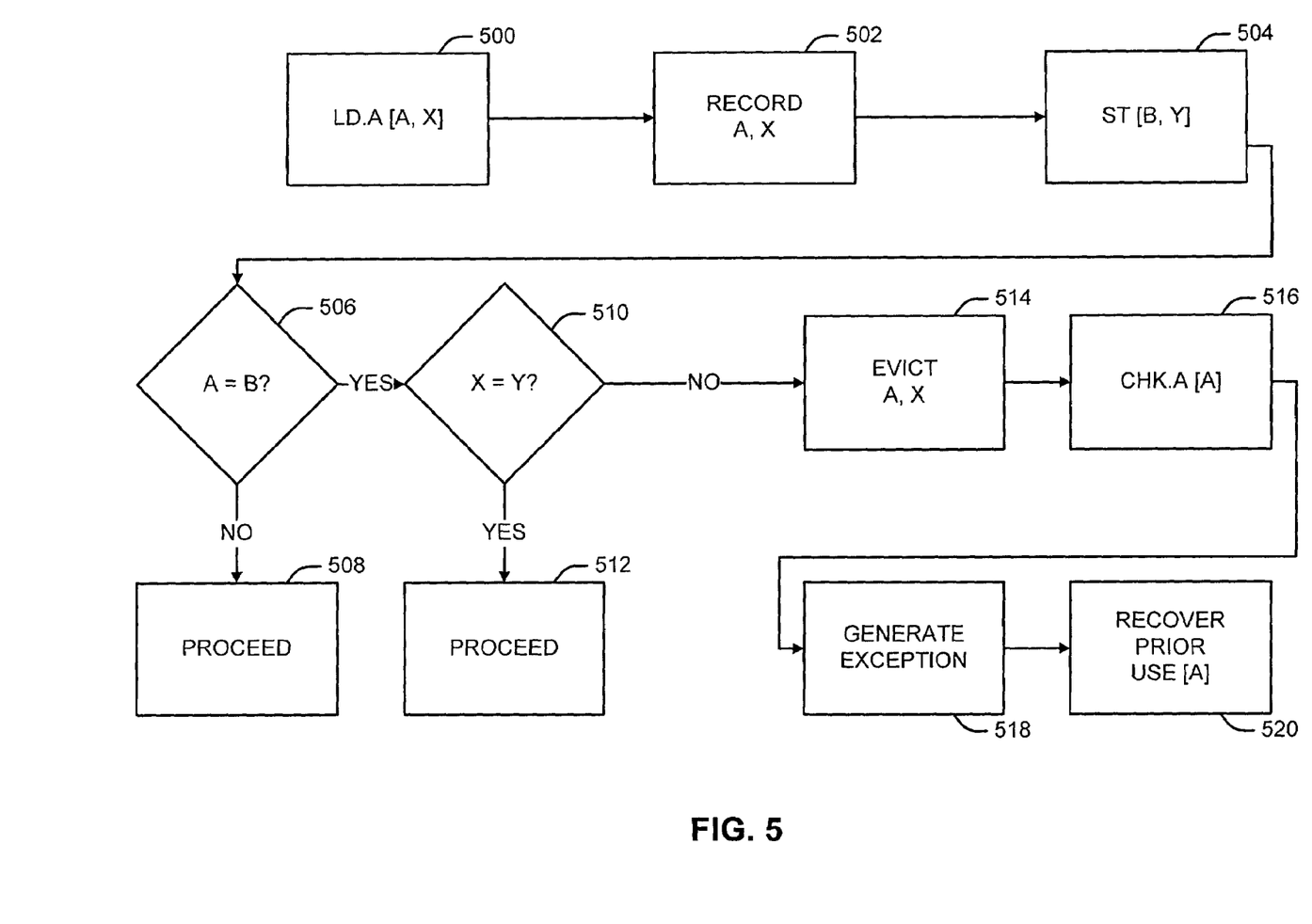
FIG. 5 is a flow chart illustrating a logical sequence for determining whether an exception should be generated after an intervening Store.

FIG. 5 illustrates an example of an alternative process that includes checking stored values. At block 500, an Advanced Load may be advanced in the computer processor's register. The instruction LD.A [A,X] instructs the processor to load the value "X" from the memory address "A." When the value "X" is loaded, the processor may then access an ALAVT an record the address "A" in association with the loaded value "X," as indicated at block 502. The processor may subsequently encounter a Store, at block 504. The instruction ST [B,Y] instructions the processor to store the value "Y" to the memory address "B." In conjunction with the Store, the processor may query, at decision block 506, whether the Store memory address "B" is the same as the Load memory address "A" that was previously accessed at block 500. If not, then the processor may continue with normal program execution, as indicated at block 508. If the addresses match, however, then the processor may check at decision block 510 whether the value previously loaded from the address (value "X" at block 500) is equal to the value that was just stored (value "Y" at block 504). If the values are equal, then the processor may continue with normal program operation, as indicated at block 512. If the values are not equal, however, the processor may follow a different routine.

If the values checked at decision block 510 are not equal, then at block 514 the processor may evict the record that associated the memory address "A" with the value "X" in the ALAVT. Subsequently, when the processor encounters an Advanced Load instruction at block 516, the processor may access the ALAVT and search for an entry with a recorded memory address "A." Because this entry was evicted at block 514, the processor will not locate an "A" entry in the ALAVT, which will cause it to generate an exception at block 518. The exception may trigger the processor to branch to a different routine or set of instructions in order to recover any prior use of the value "X" that may have been used by a different instruction after that value "X" had been loaded from memory location "A." This is indicated at block 520. After the recovery, the processor may return once again to normal program operation.

Figure 6:
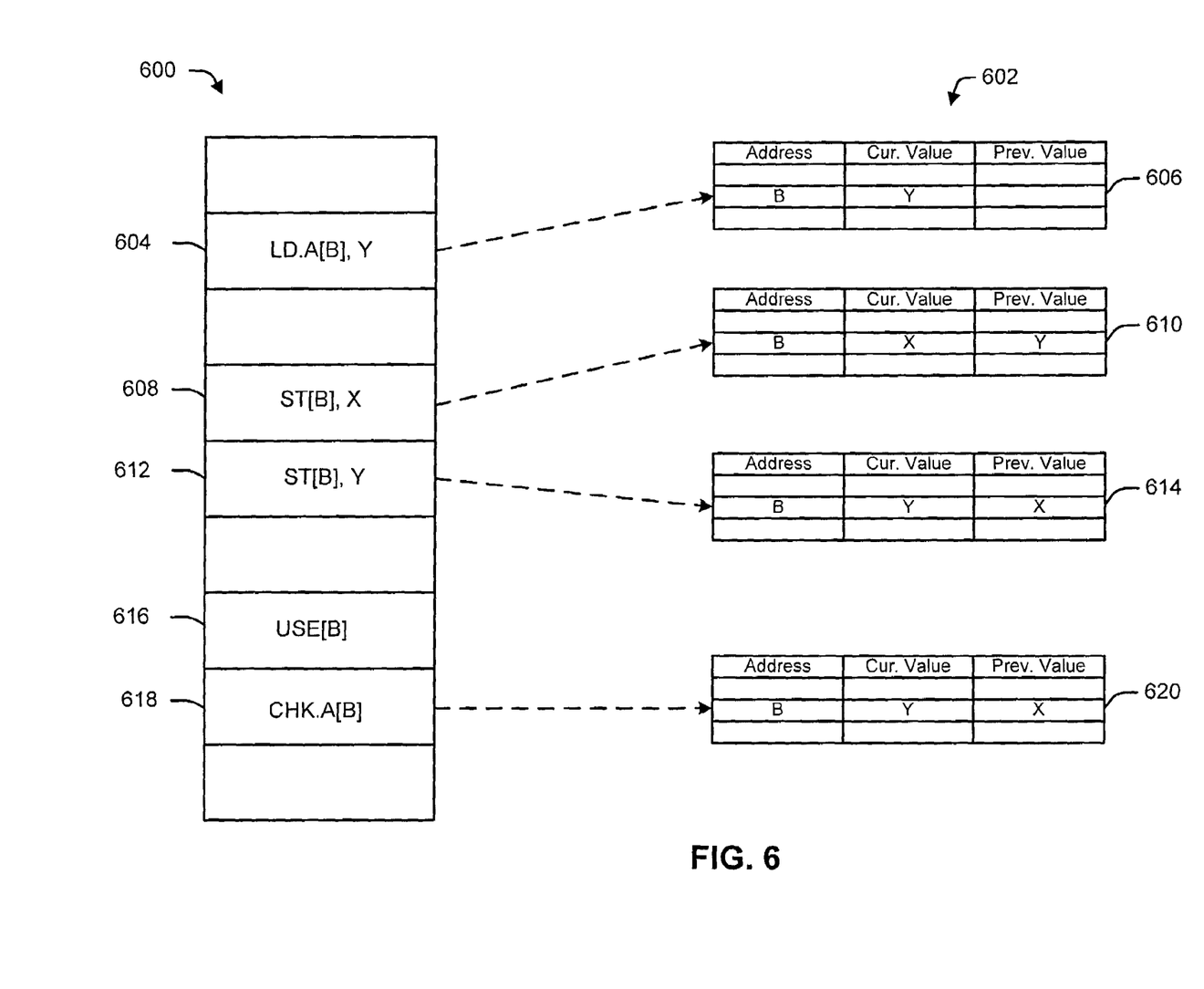
FIG. 6 illustrates an example of an alternative process that includes checking stored values.

FIG. 6 is a flow chart illustrating a logical sequence for determining whether an exception should be generated after an intervening Store. Instructions in the processor's register 600 may be performed in conjunction with accessing an ALAVT 602 in memory. Initially, an Advanced Load instruction 604, LD.A[B], Y, may instruct the processor to load the value "Y" from the memory address "B." The processor may record this Load in the ALAVT 602, by creating entry 606 that associates the address "B" with the current value "Y." A Store 608, ST[B], X, may subsequently instruct the processor to store the value "X" to the memory address "B." The processor may record this action in the ALAVT 602 by replacing "Y" with "X," the newly stored current value, and moving "Y" to the previous value position. This is indicated at entry 610. Another Store 612 may then instruct the processor to store the value "Y" to the memory address "B." This would cause "Y" to become the current value and "X" to become the previous value, as indicated at entry 614.

A subsequent Use instruction 616, calling for data from memory location "B" will use the previously loaded value "Y," which was loaded by the Load instruction 604. Although there were intervening stores 608 and 612, because the current value of the data stored at address "B" is "Y," the same value that was loaded, the processor may decline to generate an exception. This may be determined by an advanced check instruction 618, CHK.A[B], which instructs the processor to locate the address "B" in the ALAVT 602. The address may be located at entry 620, along with its associated current value "Y." The processor may compare the current value "Y" with the value previously loaded by the Load 604, also "Y," and determine that they are equal. It will be understood by those skilled in the art that if the compared values are not equal, the processor may generate an exception to trigger recovery of speculative use of the value "Y" by intervening instructions such as the Use instruction 616.

Figure 7:
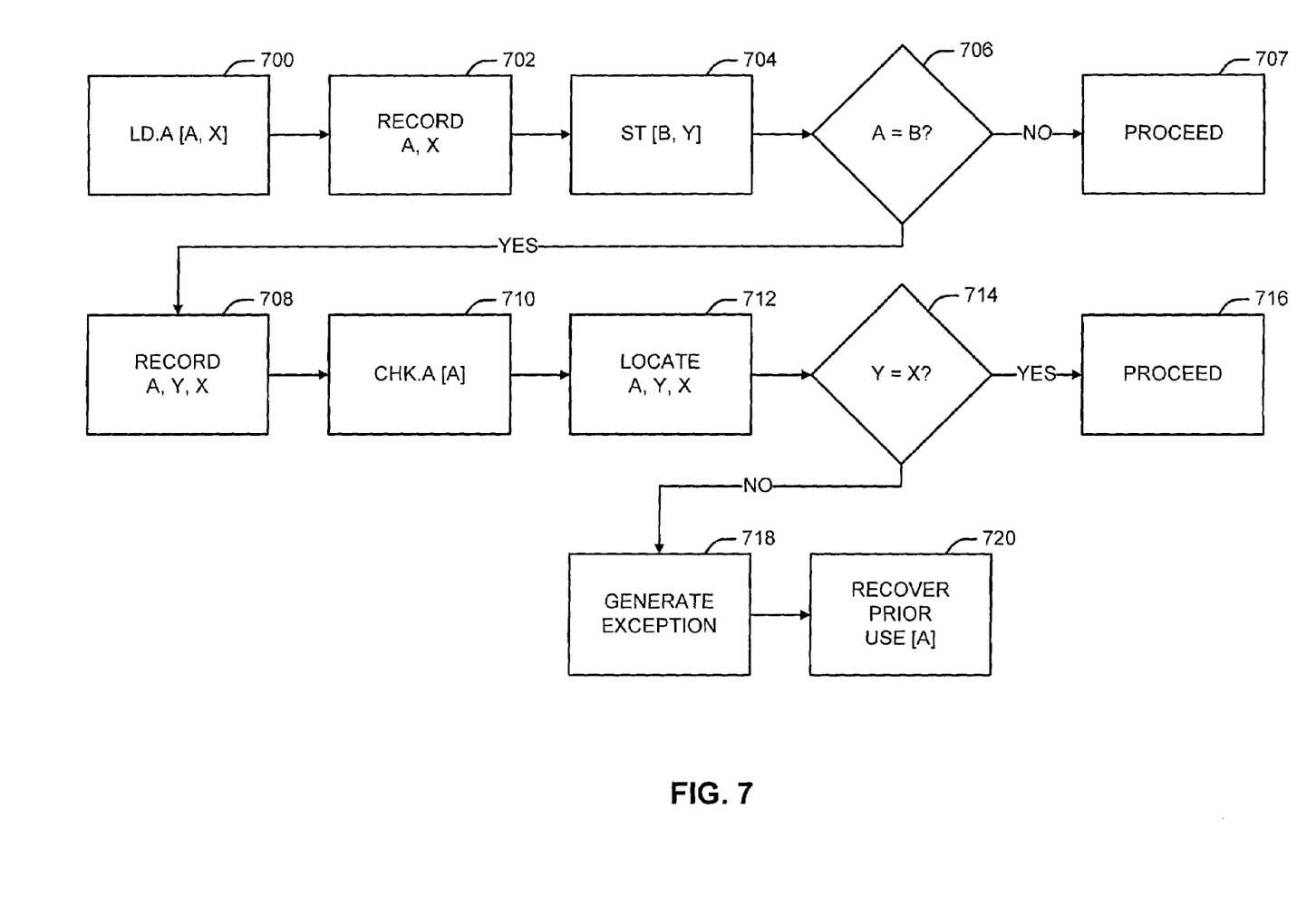
FIG. 7 is a flow chart illustrating an alternative logical sequence for determining whether an exception should be generated after an intervening Store.

FIG. 7 is a flow chart illustrating an alternative logical sequence for determining whether an exception should be generated after an intervening Store. Instead of evacuating an ALAVT entry whose value does not match an intervening Store, the newly stored value is added to the ALAVT entry. Determining whether values match may eventually take place with an Advanced Load instruction. This procedure applies to an ALAVT that includes more than one value entry for each address. While this example involves an ALAVT with two value entries for each address, such as the ALAVT 602 in FIG.

6, the teachings herein are applicable to an ALAVT having any number of value entries for each address.

At block 700, an Advanced Load LD.A [A,X] may instruct a computer processor to load the value "X" from the memory address "A." The Load may be recorded at block 702, by recording the value "X" as associated with the address "A" in an ALAVT. A Store may then be performed, at block 704. The instruction ST [B,Y] may cause the processor to store the value "Y" to the memory address "B." The processor may check at decision block 706 whether the memory address "A" is the same as the memory address "B." If not, then the processor may proceed, at block 707, with program operation. If the address are the same however, then the processor may add to the previous ALAVT entry at block 708. The processor may move the previously loaded value "X" into the "previous value" position of the ALAVT entry, and record the newly stored value "Y" to the "current value" position of the ALAVT entry, both of which are associated with the memory address "A" in the ALAVT entry.

At block 710, an Advanced Load instruction, CHK.A[A] may instruct the processor to check the ALAVT for entries that recorded the memory address "A." In the present example, the entry "A,Y,X," where "X" is the previous value and "Y" is the current value, will be located by the processor at block 712. At decision block 714, the processor may test whether the current value "Y" is equal to the previous value "X" that was loaded at block 700. If it is, then the processor may proceed with program operation at block 716, because any intervening use of the previous value "X" will have been unaffected by the newly loaded, and equal, value "Y." If the values are determined to be different, however, then at block 718 the processor may generate an exception. At block 720, the exception may trigger the processor to recover from prior use of the value "X," which has subsequently changed to "Y" causing the previous uses to be incorrect.

Thus, a novel and improved method and apparatus for re-ordering computing instructions is disclosed. Those of skill in the art would understand that the data, instructions, commands, information, signals, bits, symbols, and chips that may be referenced throughout the above description are advantageously represented by voltages, currents, electromagnetic waves, magnetic fields or particles, optical fields or particles, or any combination thereof. Those of skill would further appreciate that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor ("DSP"), an application specific integrated circuit ("ASIC"), a field programmable gate array ("FPGA") or other programmable logic device, discrete gate or transistor logic, discrete hardware components such as, e.g., registers and FIFO, a processor executing a set of firmware instructions, any conventional programmable software module and a processor, or any combination thereof designed to perform the functions described herein. The processor may advantageously be a microprocessor, but in the alternative, the processor may be any conventional processor, controller, microcontroller, programmable logic device, array of logic elements, or state machine. The software module could reside in RAM memory, flash memory, ROM memory, EPROM memory, EEPROM memory, registers, hard disk, a removable disk, a CD-ROM, or any other form of storage medium known in the art. An exemplary processor is advantageously coupled to the storage medium so as to read information from, and write information to, the storage medium. In the alternative, the storage medium may be integral to the processor. The processor and the storage medium may reside in an ASIC. The ASIC may reside in a telephone or other user terminal. In the alternative, the processor and the storage medium may reside in a telephone or other user terminal. The processor may be implemented as a combination of a DSP and a microprocessor, or as two microprocessors in conjunction with a DSP core, etc.

Illustrative embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method of executing re-ordered program instructions, the method comprising:
   loading a first value from a first memory address;
   recording the first memory address in an address portion of a first table entry of a table configured to record associations between memory addresses and values, the table comprising one or more table entries, wherein each table entry comprises a corresponding address portion, a corresponding first value portion, and a corresponding second value portion, wherein the corresponding second value portion is associated with the corresponding first value portion and the corresponding address portion;
   recording the first value in the first value portion of the first table entry;
   after recording the first value, storing a second value to a second memory address;
   determining that the first and second memory addresses are the same; and
   moving the previously recorded first value into the second value portion of the first table entry and recording the subsequently stored second value in the first value portion of the first table entry.

2. The method of claim 1, wherein the determining that the first and second memory addresses are the same comprises comparing the second memory address to the first memory address recorded in the first table entry.

3. The method of claim 1, further comprising determining that the first and second values are equal, and proceeding to a subsequent program instruction without generating an exception.

4. The method of claim 1, further comprising determining that the first and second values are different.

5. The method of claim 4, further comprising generating an exception, wherein the first value and the second value are determined to be different by comparing the first value recorded in the first table entry to the second value recorded in the first table entry.

6. The method of claim 5, further comprising executing a first instruction using the first value prior to generating the exception.

7. The method of claim 6, wherein the exception triggers recovery of previous use of the first value.

8. A computer-readable storage medium embodying a program of instructions executable by a hardware processor to:
loading a first value from a first memory address;
recording the first memory address in an address portion of a first table entry of a table, the first table entry further including a current value portion and a previous value portion;
recording the first value in the first value portion of the first table entry;
store a second value to a second memory address after recording the first value;
determining that the first and second memory addresses are the same;
moving the previously recorded first value into the second value portion of the first table entry after determining that the first memory address and the second memory address are the same; and
recording the subsequently stored second value in the current value portion of the first table entry.

9. The computer-readable media of claim 8, wherein determining that the first and second memory addresses are the same comprises comparing the second memory address to contents of the address portion of the first table entry.

10. The computer-readable media of claim 8, further comprising instructions executable by the hardware processor to:
determine that the first value and second value are equal; and
proceeding to a subsequent program instruction without generating an exception.

11. The computer-readable media of claim 8, further comprising instructions executable by the hardware processor to:
determine that the first value and second value are different after recording the second value in the current value portion of the first table entry.

12. The computer readable media of claim 8, further comprising instructions executable by the hardware processor to generate an exception.

13. The computer-readable media of claim 12, further comprising instruction executable by the hardware processor to execute an instruction utilizing the loaded first value prior to storing the second value.

14. The computer-readable media of claim 13, wherein the exception triggers recovery of the executed instruction.

15. A computer system comprising:
memory configured to store data in a plurality of locations, each location having a corresponding memory address; and
a hardware processor coupled to the memory and configured to:
advance a load instruction beyond an intervening store instruction;
loading a first value from a first memory address;
recording the first memory address in an address portion of a first table entry of a table, wherein the table is stored in the memory, the table comprising one or more table entries including the first table entry, wherein each table entry comprises a corresponding address portion, a corresponding first value portion, and a corresponding second value portion, wherein the corresponding first value portion and the corresponding second value portion are associated with the corresponding address portion;
recording the first value in the first value portion of the first table entry;
store a second value to a second memory address after recording the first value;
determining that the first and second memory addresses are the same;
moving the previously recorded first value into the second value portion of the first table entry and record the subsequently stored second value in the first value portion of the first table entry; and
generate an exception when the first value and the second value are determined to be different by comparing the first value to the second value.

16. The computer system of claim 15, wherein the computer system comprises a base station.

17. A computer system comprising:
means for storing data, wherein the data includes a table having multiple entries, each entry including a corresponding address portion, a corresponding current value portion, and a corresponding previous value portion, each entry to store at least two values that are associated with a memory address; and
a hardware processor configured to:
load a first value from a first memory address;
record the first memory address in a first entry of the table;
record the first value in the current value position of the first entry;
store a second value to a second memory address after recording the first value;
determine that the first and second memory addresses are the same;
move the previously recorded forst value into the previous value portion of the first entry; and
record the subsequentyly stored second value in the current value position of the first entry.

18. The computer system of claim 17, wherein the computer system comprises a base station.

19. The computer system of claim 17, wherein the hardware processor is adapted to re-order processing instructions to advance a Load instruction beyond an intervening Store instruction.

20. The computer system of claim 17, wherein the hardware processor is further configured to re-order instructions to be executed in conjunction with a compiler.

21. The computer system of claim 20, wherein the hardware processor is further configured to execute a plurality of instructions in parallel during a clock cycle.

22. The method of claim 1, wherein moving the previously recorded first value into the second value portion of the first table entry and recording the subsequently stored second value in the first value portion of the first table entry replaces the previously recorded first value with the subsequently stored second value in the first value portion of the first table entry.

23. The method of claim 8, wherein recording the subsequently stored second value in the current value portion of the first table entry replaces the previously recorded first value with the subsequently stored second value in the current value portion of the first table entry.

24. The method of claim 15, wherein moving the previously recorded first value into the second value portion of the first table entry and recording the subsequently stored second value in the first value portion of the first table entry replaces the previously recorded first value with the subsequently stored second.

25. The method of claim 17, wherein recording the subsequently stored second value in the current value portion of the first entry replaces the previously recorded first value with the subsequently stored second value in the current value portion of the first entry.

* * * * *